UNITED STATES PATENT OFFICE.

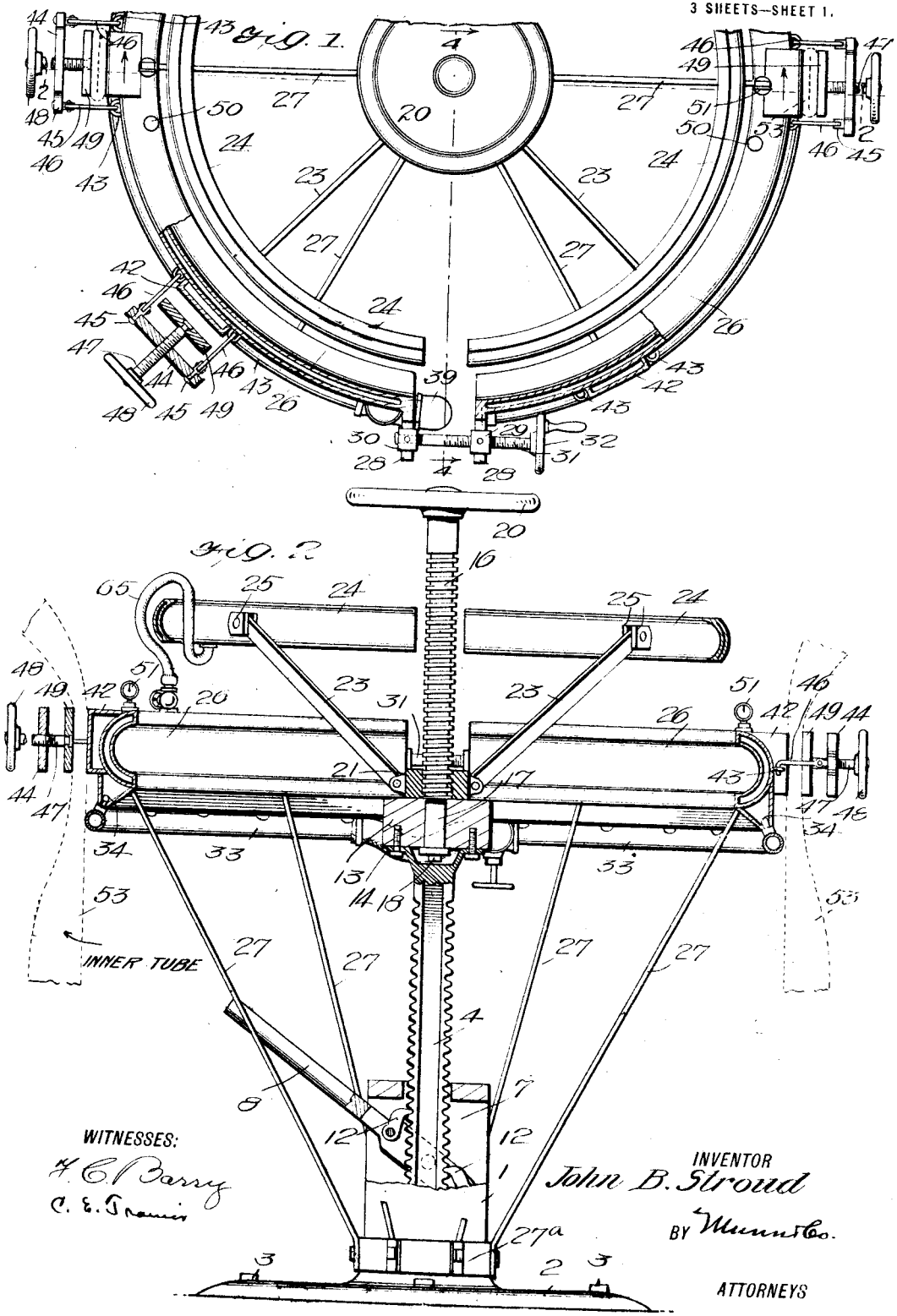

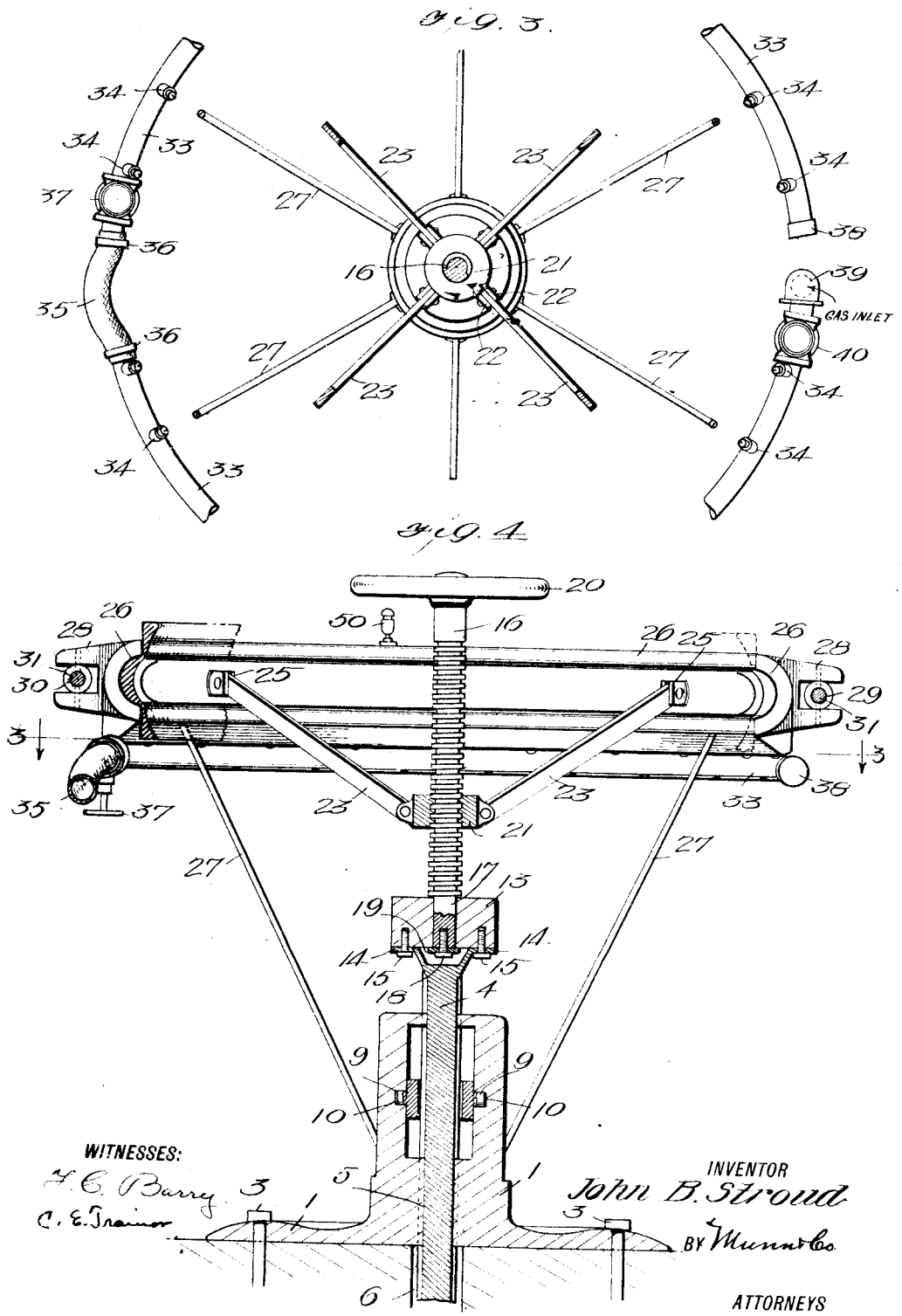

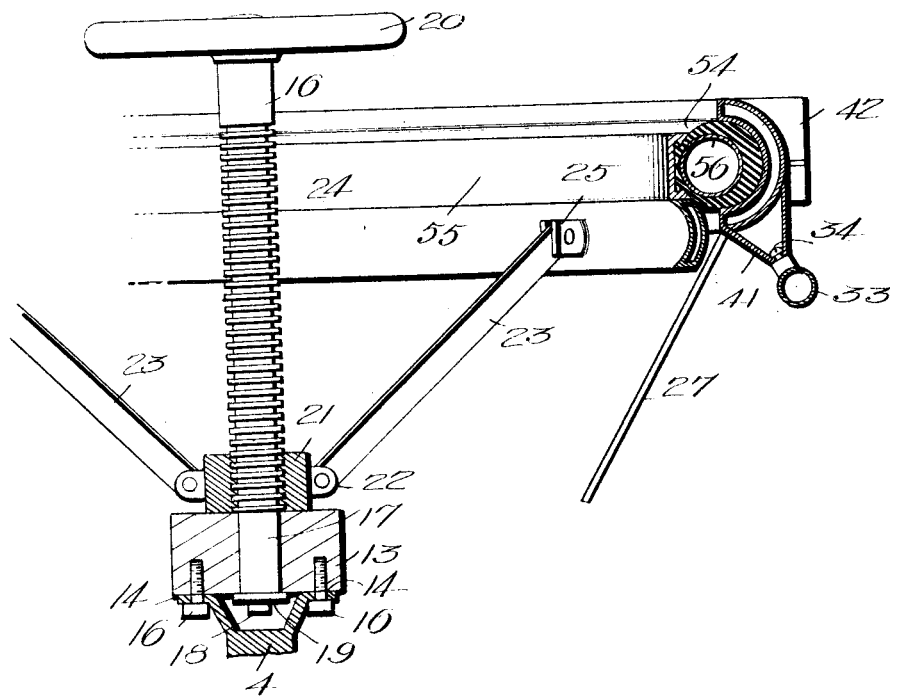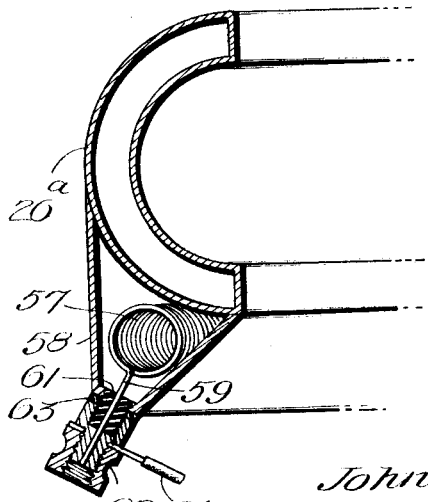

JOHN BELL STROUD, OF PASS CHRISTIAN, MISSISSIPPI.

VULCANIZER.

1,181,692.     Specification of Letters Patent.     Patented May 2, 1916.

Application filed October 13, 1915. Serial No. 55,708.

*To all whom it may concern:*

Be it known that I, JOHN B. STROUD, a citizen of the United States, and a resident of Pass Christian, in the county of Harrison and State of Mississippi, have invented a new and useful Improvement in Vulcanizers, of which the following is a specification.

My invention is an improvement in vulcanizers, and the invention has for its object to provide a vulcanizer especially designed for use with automobile tires, wherein the vulcanizer is so arranged that the shoe or casing of the complete tire may be easily inserted for vulcanizing and removed, and wherein a number of inner tubes may be simultaneously vulcanized during the vulcanization of the tire.

A further object of the invention is to so support a portion of the vulcanizer that it may be adjusted to a convenient height for working upon the tire, and to permit the vulcanizer to be adjusted for various sizes of tires.

In the drawings: Figure 1 is a partial top plan view of the vulcanizer; Figs. 2 and 4 are sections on the lines 2—2 and 4—4, respectively, of Fig. 1, each view looking in the direction of the arrows adjacent to the line; Fig. 3 is a section on the line 3—3 of Fig. 4, looking in the direction of the arrows adjacent to the line. Fig. 5 is an enlarged section showing a tire in place, and Fig. 6 is a sectional view showing an electric heater.

In the embodiment of the invention shown in Figs. 1 to 4, a suitable support is provided, consisting of a chambered body 1 and a disk-shaped base 2, which may be secured to a suitable support by means of bolts or spikes 3. The support has a vertical passage 5, registering with an opening 6 in the floor or other supporting surface for the support, and the chamber 7 extends transversely of the body of the base near the upper end thereof, the passage 5 extending through this chambered portion and through the upper end of the support. A double rack bar 4 is mounted to move in this passage 5, the rack bar having teeth at opposite sides thereof as shown in Fig. 2, and the rack bar is movable vertically with respect to the base by means of a lever 8. This lever 8 is arranged in the chamber 7, and the lever is enlarged within the chamber and is provided with a longitudinally extending slot through which the rack bar 4 extends. The lever at the slot has oppositely extending journal pins 9 and these pins engage recesses 10 in the chamber walls, thus pivotally connecting the lever to the support. The lever has oppositely arranged pawls 12, which are pivoted to the lever in the opening and at opposite ends of the opening, the said pawls being adapted to engage the teeth of the rack bar. It will be obvious that when the free end of the lever is raised and lowered the pawls will alternately engage the teeth to lift the rack bar, and the rack bar supports the holding mechanism for the tire and part of the vulcanizing mechanism. A block 13 is secured to the upper end of the bar, the said bar having horizontal flanges 14 at its upper end which abut the under face of the block, and the flanges are secured to the block by means of machine bolts or screws 15. A threaded rod or shaft 16 is journaled in the block at its lower end, the said shaft or rod having a plain portion 17, which engages a central opening in the block, and the shaft or rod is rotatably held in the block by means of a screw 18, which passes through a washer 19 and engages a threaded opening in the lower end of the shaft or rod. The washer is of greater diameter than the opening through the block and the shaft or rod is thus held rotatably in the block. The shaft or rod has a hand wheel 20, secured to its upper end for convenience in rotating the same, and a nut 21 is threaded on to the shaft, for vertical movement when the shaft or rod is turned. The block 13 is disk-shaped as is also the nut, and the nut has pairs of laterally spaced radial lugs 22, to each pair of which is pivoted the lower end of a link 23. Each of the links extends upwardly and outwardly to a pivotal connection with a section of a hollow casing 24. Four of the links 23 are provided, and each section of the casing 24 is pivoted to two links. Each of the sections 24 is approximately semi-circular, and each section is curved transversely, and is arranged with its concave face inwardly. The casing is hollow and the ends of each section are closed, as shown more particularly in Fig. 4. Each of the sections of the casing 24 has two pairs of inwardly extending radial lugs 25, the members of each pair being spaced apart to receive between them the adjacent end of the adjacent link 23. A second sectional casing 26 is supported by the support 1—2, by means of inclined supporting rods 27. Each of the said rods 27 is connected at its lower end to a ring 27ª, which encircles the body 1 of the support near the base. Each of the sections of the casing 26 is arc-shaped longitudinally, being approximately a semi-circle, and each casing is arc-shaped transversely. Each section of the casing 26 is also closed at its ends, and the ends are connected by the mechanism shown more particularly in Fig. 1. The casing 26 very closely resembles the casing 24, being however, of larger size and capacity, of such size and capacity that the casing 24 may fit within the casing 26.

The connection between the sections of the casing 26 above referred to comprises radially extending lugs 28 at the ends of the casing. Each of the lugs 28 is recessed or notched at its outer end as shown more particularly in Fig. 4, and a nut 29 is pivoted within the notch of one lug of each section, while a bearing 30 is pivoted in the notch of the other lug. Thus each section of the casing 26 is provided at one end with a pivotally mounted nut and at the other with a pivotally mounted bearing, and a threaded rod 31 is journaled in each bearing, the threaded portion of the rod passing through the nut at the adjacent end of the other section. Each rod is provided with a hand wheel 32 at the end remote from the bearing for convenience in rotating the same, and it will be obvious that when the rod is rotated by means of the hand wheel the adjacent ends of the sections will be moved toward or from each other.

A gas heater is connected with the casing 26 and is supported by the said casing. This heater comprises two arc-shaped pipes 33, and each pipe is provided with a series of burners 34. These burners extend upwardly and inwardly as shown more particularly in Fig. 3, being directed toward the outer under surface of the casing 26. The sections of the heater are connected at one end by a flexible pipe 35, the said pipe being fitted over the adjacent ends of the sections and clamped thereto as indicated at 36, and a valve 37 is interposed in one of the sections adjacent to the said pipe. The opposite end from the pipe 6 of one of the sections is closed by a cap 38, and an inlet pipe 39 is connected with the adjacent end of the other section. A cut off valve 40 is interposed between the inlet pipe 39 and the adjacent section, and it will be obvious that when this valve is open and the valve 37 closed, the fuel will be supplied only to the one section of the heater. When the valve 37 is opened however, fuel will be supplied to both sections. A hood 41 is arranged between each section of the heater and the adjacent section of the casing, and each hood is approximately triangular in shape in cross section, having its apex at the section of the heater and the burners 34 extend through the hood at this point into the hood. The side walls of the hood diverge, the inner wall being secured to the adjacent section of the casing 26 at its lower edge, while the outer wall extends approximately vertical to a connection with the outer wall of the section, near the center of the said outer wall.

Each section of the outer casing is provided on its peripheral surface at regular intervals with hollow extensions 42, which are merely casings having one wall open, that is, the wall adjacent to the casing section, and the extensions are fitted against the outer face of the casing, the outer wall of each extension forming a flat surface as shown in Fig. 2. Each section of the casing 26 has three extensions, one near each end, and one near the center. Each section is provided with a pair of eyes 43, at each of the casings, the members of each pair being arranged on opposite sides of the extensions, and a clamping device is connected with each pair of eyes. Each of the said clamping devices comprises a plate 44, having at each end a pivotally mounted bearing lug 45, and a hooked link 46 is pivoted to each bearing lug, the hook of each link being adapted to engage an eye 43 at an extension. A rod 47 is threaded through each plate 44, and each rod has a hand wheel 48 at its outer end. A clamping plate 49 is rotatably connected with the inner end of each rod, and each of the said plates 49 is adapted to coöperate with the flat outer face of the adjacent extension. By means of these clamping plates inner tubes may be clamped against the extensions 42 to be vulcanized at the same time that a shoe or casing is vulcanized between the casings 24 and 26. The clamping elements supported by the plates 44 may be easily detached, merely by releasing the links 46 from the eyes 43. A safety or relief valve 50 is connected with each section of the casing 26, and a steam gage 51 is also provided in connection with each section.

In operation, the casing sections 24 and 26 are filled or partially filled with water, and a shoe to be vulcanized is clamped between the sections 24 and 26. The sections 24 may be moved by moving the nut 21 with respect to the block 13. The sections 24 may be raised above the sections 26 as shown in Fig. 2, and the shoe or casing is fitted in the sections 26 of the outer casing. The rack bar 4 is then lowered until the sections 24 are in approximate register with the sections 26 but a little higher. The hand wheel 20 is now turned in a direction to lift the nut 21 with respect to the block 13, and to force the sections 24 against the concave surfaces of the casing 26, thus clamping the shoe or casing between the inner and the outer casings. If an inner tube indicated at 53 is to be vulcanized at the same time, the said inner tube is clamped in the position shown in Figs. 1 and 2 between the extensions 42 and the clamping plates 49. Several inner tubes may be vulcanized at the same time with the shoe. The parts being arranged as above specified, the gas is turned on to the burners, and the gas is lighted. The water in the casings 24 and 26 is heated, and the heat vulcanizes the rubber. Over-heating is prevented by the gages 51 and the relief or safety valve 50.

The casing 26 may be expanded or contracted by means of the hand wheels 32 to fit the shoe or casing upon which they are to be used. The inner casing adjusts itself automatically to the outer casing. This casing is forced against the outer casing by means of the shaft or rod 16.

In Fig. 5 the device is shown in position to vulcanize an inflated shoe in place on the rim. The shoe 54 as shown, is arranged on the rim 55, and the inner tube 56 is in place. The shoe is fitted into the outer casing 26 as shown, and the inner casing 24 is arranged just beneath the lower edge of the rim 55 to support the inflated tire. The operation is precisely the same as in the arrangement shown in Figs. 1 to 4.

In Fig. 6 an electric heater is shown in connection with the outer casing 26ª, corresponding to the casing 26. This heater is in the form of a coil 57 of resistance wire, and this wire is arranged within a hood 58 corresponding to the hood 41. The terminals 59 of the coil are passed out through nipples 60 in the hood, an insulating sleeve 61 being arranged between the terminal and the nipple, and a binding post 62 is connected with each terminal, the said binding post being insulated from the hood by an insulating washer 63. One of the terminals 64 of a suitable source of electrical energy is clamped to each binding post. The operation with the present construction is precisely the same as in those just described, with the exception that electricity is used to heat the vulcanizer instead of gas.

By means of the lever 8, the inner casing of the vulcanizer, may be adjusted to the precise height desired, that is, to a convenient height to operate upon the tire.

It will be noticed from an inspection of Fig. 2, that the inner sections are preferably connected to the outer sections, by means of a flexible pipe 65 or the like. This pipe will permit the steam to pass from the outer sections to the inner sections, to equalize the heating of the article to be vulcanized, and since the pipe is flexible, it will not interfere with the movement of the vulcanizer. It will be understood that in Fig. 5 the same connection is preferably provided. A valve is also provided in the connection 65.

I claim:—

1. A vulcanizer comprising an outer casing composed of approximately semi-circular segments, an inner casing composed of approximately semi-circular segments, each segment being hollow and curved transversely to fit a tire, the sections of the inner casing fitting within the sections of the outer casing, a heater arranged below each section of the outer casing and connected thereto, a hood between the heater and the outer casing for directing the heat of the heater against the outer casing, said sections being adapted to contain water, means for raising and lowering the inner casing, means for clamping the said casing against the outer casing, means for moving the sections of the outer casing toward and from each other, and for holding them in adjusted position, and a series of means for clamping inner tubes to the outer casing.

2. A vulcanizer comprising an outer casing composed of approximately semi-circular segments, an inner casing composed of approximately semi-circular segments, each segment being hollow and curved transversely to fit a tire, the sections of the inner casing fitting within the sections of the outer casing, a heater arranged below each section of the outer casing and connected thereto, a hood between the heater and the outer casing for directing the heat of the heater against the outer casing, said sections being adapted to contain water, means for raising and lowering the inner casing, means for clamping the said casing against the outer casing, and means for moving the sections of the outer casing toward and from each other.

3. A vulcanizer comprising an outer casing composed of approximately semi-circular segments, an inner casing composed of approximately semi-circular segments, each segment being hollow and curved transversely to fit a tire, the sections of the inner casing fitting within the sections of the outer casing, a heater arranged below each section of the outer casing and connected thereto, a hood between the heater and the outer casing for directing the heat of the tire against the outer casing, said sections being adapted to contain water, means for raising and lowering the inner casing, and means for clamping the said casing against the outer casing.

4. A vulcanizer comprising an outer casing composed of approximately semi-circular segments, an inner casing composed of approximately semi-circular segments, each segment being hollow and curved transversely to fit a tire, the sections of the inner casing fitting within the sections of the outer casing, a heater arranged below each section of the outer casing and connected thereto, said sections being adapted to contain water, means for raising and lowering the inner casing, and means for clamping the said casing against the outer casing.

5. A vulcanizer comprising an outer casing and an inner casing, said casings being sectional and each section being curved transversely and hollow and adapted to contain water, a support for the sections of the outer casing, a support for the sections of the inner casing and movable vertically with respect to the sections of the outer casing, said sections of the inner casing being connected to the said support to swing toward and from the sections of the outer casing, and the said sections fitting within the sections of the outer casing, a heater supported by the sections of the outer casing, a connection between the sections of the outer casing and adjustable to move the said sections toward and from each other, and a series of means for clamping inner tubes to the outer casing, each of the said means being detachable.

6. A vulcanizer comprising an outer annular member embodying segmental sections, means for moving such sections toward and away from one another to vary the diameter of the annular member, an inner annular member arranged in coöperative relation with the outer annular member and formed of segmental sections, and means for spreading or contracting the sections of the inner annular member to vary its diameter.

7. A vulcanizer comprising an outer expansible annular member formed of sections, means for adjusting such sections to vary the diameter of the annular member, an inner expansible annular member disposed to coact with the outer member, and means for raising, lowering and expanding the inner member and holding it in the desired adjusted position.

8. A vulcanizer comprising an outer expansible annular member formed of sections, means for adjusting such sections to vary the diameter of the annular member, a support, connections between the support and the sections, a block adjustable vertically from the support, an inner expansible annular member formed of sections, a nut, connections between the nut and inner sections, and a screw coöperating with the nut and connected with the said block by means of a swivel joint.

JNO. BELL STROUD.

Witnesses:
 REBELLIA A. BRANDT STROUD,
 ANNA M. BRANDT.